United States Patent [19]
Archer et al.

[11] 3,887,357

[45] June 3, 1975

[54] METHOD FOR FACILITATING THE HARVEST OF FRUIT

[75] Inventors: Milton C. Archer, Olivette; John E. Franz, Crestwood, both of Mo.

[73] Assignee: Monsanto Company, St. Louis, Mo.

[22] Filed: Oct. 31, 1973

[21] Appl. No.: 411,584

[52] U.S. Cl. .......................................... 71/95; 71/74
[51] Int. Cl. .............................................. A01n 9/22
[58] Field of Search .................................. 71/74, 95

[56] References Cited
UNITED STATES PATENTS
2,865,730  12/1958  Gates et al. ............................ 71/95
2,995,577  8/1961  Savers et al. ........................... 71/74

OTHER PUBLICATIONS
Jan Overbeck et al., Chem. Abst., Vol. 49, (1955) 7798F.
Muir, Chem. Abst., Vol. , (1960) 2502e.

*Primary Examiner*—Lewis Gotts
*Assistant Examiner*—Catherine L. Mills
*Attorney, Agent, or Firm*—Arnold H. Cole; Donald W. Peterson; Neal E. Willis

[57] ABSTRACT

The harvest of fruit from bearing trees is facilitated by application of effective concentrations of N-(substituted phenyl)maleimides.

10 Claims, No Drawings

METHOD FOR FACILITATING THE HARVEST OF FRUIT

This invention relates to a method for facilitating the harvest of tree fruit. More particularly, it is concerned with the provision of a novel chemical agent which serves to accelerate or enhance the normal abscission process in such fruit.

The commercial growing of edible tree fruit is a major international industry. As expected, those engaged in this industry are concerned about getting their product to the consumer in the most economical manner. Traditionally, the harvesting of fruit crops has been accomplished by hand picking. However, in recent years, shortages of manual laborers have become increasingly more frequent. Coupled with constantly spiraling wages, such shortages have lent impetus to the investigation of alternative harvesting methods.

One result of this investigation has been the development and testing of a wide variety of mechanical devices designed to reduce or limit the need for manual efforts. Said devices have generally been vibrators or shakers which can be driven through the areas where the fruit-bearing trees grow. They attach to the trunk, or to major branches, and are actuated to produce a vibratory motion which either loosens the fruit or causes it to fall to the ground. Certain of these mechanical devices also include means for catching or otherwise collecting the fruit as it falls. Although several types of such devices are now being used, they normally require pretreatment of the fruit with an abscission agent in order to be effective, and they often present a problem by causing damage to whole trees or parts thereof.

According to the present invention, the harvesting of tree fruit is facilitated by applying thereto a chemical agent. Although the mode of action of the chemical on the fruit is not known with certainty, it is found that the treated fruit are more loosely attached to the stem. Removal of such fruit from the tree is thus facilitated, and, indeed, the treated fruit often fall from the tree without the need for an external force, either manual or mechanical.

In practicing the present invention, the particular chemical agents employed are N-(substituted phenyl)-maleimides of the formula

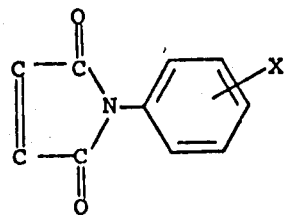

wherein X represents 2-chloro, 4-chloro, 3-nitro, 4-methyl or 4-methoxy. Such compounds are among those described as auxin antagonists for use as defoliants or to inhibit growth of maize coleoptile sections in American Journal of Botany, Vol. 42, No. 3, pgs. 205–213 (1955). Related compounds wherein the maleimide ring is halogenated are described as herbicides and/or defoliants in U.S. Pat. No. 2,865,730.

The compounds of this invention are most advantageously applied to the fruit-bearing plant by spraying. While such application will normally be carried out with ground-based equipment, aerial spray techniques can be employed in those instances where a particular crop or cultural practices indicate economic feasibility.

For use in accordance with this invention, said compounds may be formulated and applied as liquids, dust or wettable powders following procedures known to the art. The active ingredient is admixed with a suitable inert material serving as a solvent, diluent or dispersant, after which such admixture is further diluted to desired volume of spray. It will be understood that the composition to be applied can also contain surfactants, wetting agents, emulsifiers, sticking agents or other types of adjuvants whose nature and function have long been recognized in the art.

It is particularly preferred to use the compounds of the present invention as an aid in the harvesting procedures for the fruit of the non-deciduous trees, citrus and olives. The time of application will vary from a few days (e.g., 3–4) up to about 2 weeks prior to the planned date of harvest. Specific selection within this short range will be dependent upon the type and variety of fruit being treated and upon the stage of fruit development prior to treatment. These factors will also be considered in the determination of the rate of application. From a practical standpoint, the compound of this invention is applied in a spray concentration of from about 750 to 4,000 ppm. (parts per million) active ingredient in total spray volume. A desirable degree of harvest facilitation is not obtained at lesser concentrations, while higher concentrations detract from economy and may also cause undesired injury to leaves and/or green fruit.

To illustrate the practice of the method of this invention, tests are conducted to determine the effect of the N-(substituted phenyl)maleimides on various tree fruit. Branches selected for these tests are those which contain at least 20 pieces of fruit that are to be harvested within the following 2 weeks. The fruit are sprayed with a formulation of the active ingredient described herein and a number of days after treatment, observations are made of the number of fruit which have fallen to the ground. Fruit which has not fallen is clipped from the branch with the stem attached to the fruit, and measurement is made of the force in pounds required to remove the fruit from the stem on a straight pull. Apparatus for such measurements is described in *Plant Physiology*, Volume 43, Part B, pages 1560–1576 (1968). When the force required to remove the fruit from the stem is too small to be measured on such apparatus, is designated as "too loose to pull."

In these tests, observations are also made of any adverse effects on any leaves or green fruit which may be present on the branches. The extent of plugging, the removal of a part of the peel or rind when the stem is pulled from the fruit, is similarly noted along with any other indications of fruit injury. Although significant portions of most fruit crops are used for processing into juices, concentrates and canned sections, the remainder must be marketed as fresh fruit. While injuries such as rind pitting, burning or discoloration are not of real concern in the case of processed fruit, such undesirable changes in appearance are detrimental to fresh fruit sales. In addition, injuries such as plugging or rind splitting cannot be accepted for either market since they generally lead to rapid fruit rot.

In the illustrative tests hereinafter presented, should be understood that untreated control branches are selected in each instance, and corresponding measurements urements and observations are made of the fruit thereof. The tests also included treatment of branches with cycloheximide, a known fruit abscission agent, at a rate which would normally cause all treated fruit to drop or be too loose for a measurement of pull force. By noting those instances in which this known compound does not demonstrate its expected activity, conclusions can be drawn as to the validity of a particular test due to the adverse effects of external factors. Some of these external factors include problems with the spraying apparatus which often leads to inadequate or non-uniform application, and rainfall within a few hours after application, which may wash off the chemical treatment.

EXAMPLE I

Spray formulations for this test are prepared by mixing a small quantity (1 or 2 grams) of a compound of this invention in acetone, adding about 10 ml. of surfactant, and thereafter diluting with water to a total volume of 500 ml. The active ingredient in these formulations is thus present in concentrations of 2,000 and 4,000 ppm., and sprays are applied to branches of Valencia oranges. After 7 days, the fruit is observed, and measurements of pull force are made for at least 10 fruit from each branch to which fruit is still attached. The untreated fruit on the control branch requires an average pull of 19.1 pounds, and 60 percent plugging is noted. However, with either N-(2-chloro or 4-chlorophenyl)maleimide at both rates employed, all of the treated fruit has fallen to the ground prior to the observation date. Some leaf drop and fruit burn is noted on the treated fruit.

EXAMPLE II

About 6 weeks after the above test, the same variety of fruit was tested at the same application rates with each of the five compounds of this invention. After 7 days, the untreated fruit on the control branch requires an average pull of 18.8 pounds, and 60 percent plugging is noted. At the 2,000 ppm. concentration, fruit treated with N-(2-chlorophenyl)maleimide require an average pull of 14.1 pounds with 20 percent plugging, while fruit treated with N-(4-chlorophenyl)maleimide require an average pull of 4.5 pounds with no plugging. The fruit treated with these two compounds at 4,000 ppm., and the fruit treated with the other three compounds at both concentrations is found to be either too loose to pull or has already fallen to the ground. Some fruit burn and leaf drop is again noted, particularly at the higher concentration.

EXAMPLE III

In this test, spray formulations of N-(4-methoxyphenyl)maleimide are prepared as described above at concentrations of 500, 750, 1,000, 2,000 and 4,000 ppm., and branches containing Hamlin oranges are treated at each rate. After 7 days, the untreated fruit on the control branch require an average pull of 14.3 pounds, and plugging is observed on 80 percent of such fruit. With the treatment at 500 ppm., the average pull force required is 17.2 pounds with 40 percent plugging, while at 750 ppm. the required average pull force drops to 15.3 pounds with no plugging. At the three higher concentrations, average pull force is from 10.2 to 11.7 pounds, and the only plugging noted is 10 percent at 4,000 ppm. Leaf drop and fruit burn noted at the highest concentration are reduced to minimal at the lower concentrations.

While the invention has been described herein with regard to certain representative examples for purpose of illustrating its practice, it is not to be construed as limited thereto. Those skilled in the art will readily recognize the variations and modifications which can be made without departing from the spirit and scope of this invention.

What is claimed is:

1. A method for facilitating the harvest of fruit from non-deciduous trees which comprises applying to the fruit bearing trees, within 2 weeks of the date of harvest, an effective amount of a compound of the formula

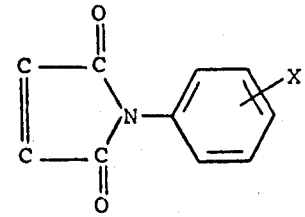

wherein X is 2-chloro, 4-chloro, 3-nitro, 4-methyl or 4-methoxy.

2. A method as defined in claim 1 wherein application is at a concentration of 750 to 4,000 ppm.

3. A method as defined in claim 1 wherein application is at least 3 or 4 days prior to the date of harvest.

4. A method as defined in claim 1 wherein the fruit are citrus or olives.

5. A method as defined in claim 4 wherein the fruit are citrus.

6. A method as defined in claim 1 wherein application is at a concentration of 750 to 4,000 ppm. and is at least 3 or 4 days prior to the date of harvest.

7. A method as defined in claim 6 wherein the fruit are citrus.

8. A method as defined in claim 1 wherein the compound is N-(2-chlorophenyl)maleimide.

9. A method as defined in claim 1 wherein the compound is N-(4-chlorophenyl)maleimide.

10. A method as defined in claim 1 wherein the compound is N-(4-methoxyphenyl)maleimide.

* * * * *

UNITED STATES PATENT OFFICE
CERTIFICATE OF CORRECTION

Patent No. 3,887,357            Dated    June 3, 1975

Inventor(s)    Milton C. Archer et al.

It is certified that error appears in the above-identified patent and that said Letters Patent are hereby corrected as shown below:

On the cover sheet, cancel the figure and cancel the two sheets of drawings.

Signed and Sealed this

*twenty-seventh* Day of *April 1976*

[SEAL]

Attest:

RUTH C. MASON
*Attesting Officer*

C. MARSHALL DANN
*Commissioner of Patents and Trademarks*